Feb. 7, 1956
L. J. WARNECK
2,734,181
COMBINED HORN SOUNDING AND HEADLIGHT BEAM
SELECTOR AND WIRING SYSTEM THEREFOR
Filed April 14, 1954
2 Sheets-Sheet 1
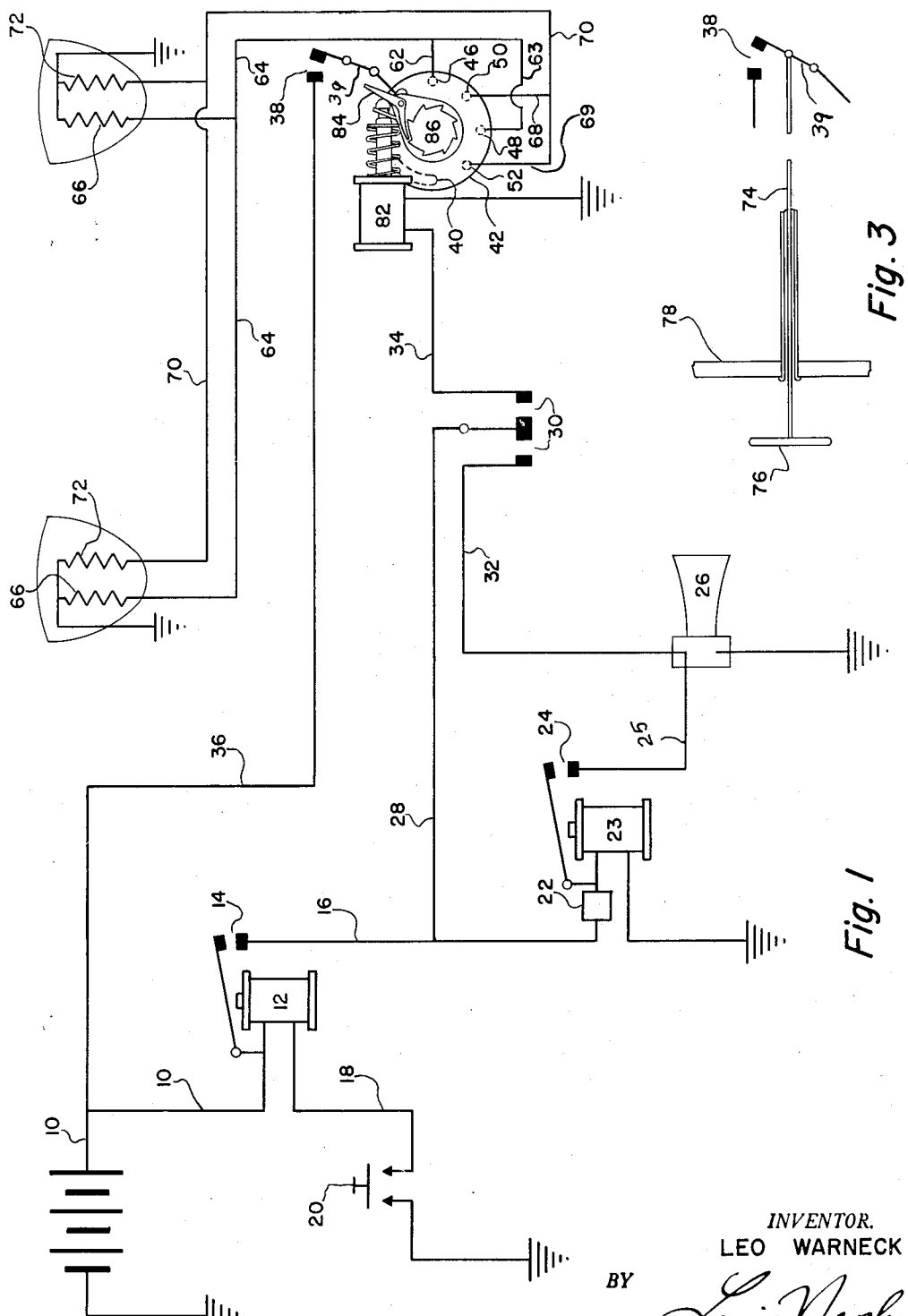
INVENTOR.
LEO WARNECK
BY Louis Nechs
ATTORNEY

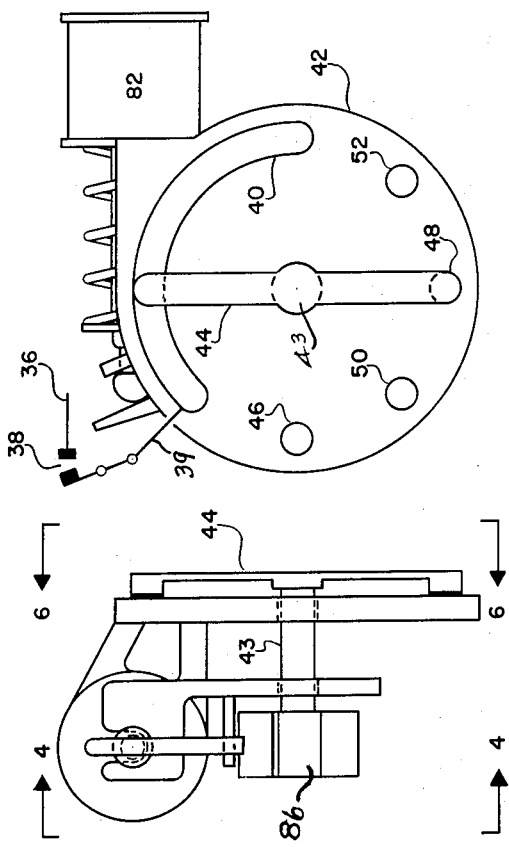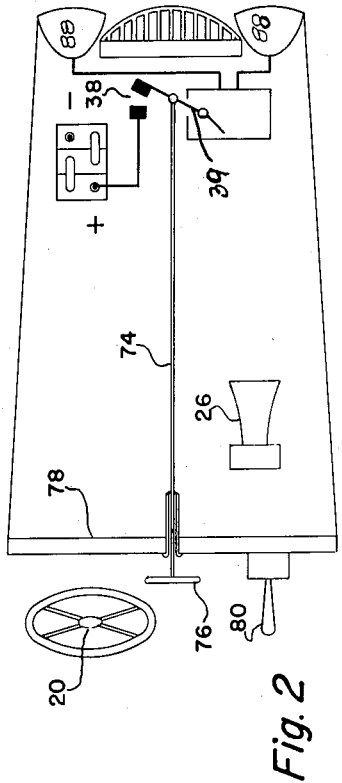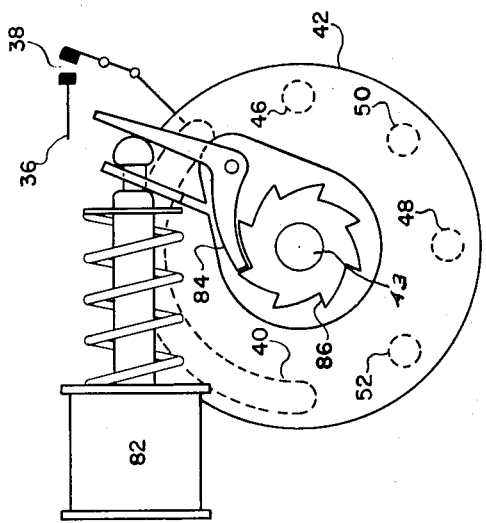

United States Patent Office 2,734,181
Patented Feb. 7, 1956

2,734,181

COMBINED HORN SOUNDING AND HEADLIGHT BEAM SELECTOR AND WIRING SYSTEM THEREFOR

Leo J. Warneck, Philadelphia, Pa.

Application April 14, 1954, Serial No. 423,026

3 Claims. (Cl. 340—75)

In motor cars as presently made, the wiring of the light circuits is such that there is a decided and measurable drop in the voltage between the battery and the headlights. This is due to resistance losses over the relatively long wires over which the current must travel.

It is therefore one object of this invention to reduce the length of wire over which the current must travel between the battery and the headlights so as to reduce the resistance loss and thus improve the efficiency of the headlights.

Also, in present day cars, the horn is controlled by one switch and the high and low beams of the headlights are selected by another control switch which is usually foot-operated.

It is therefore a still further object of the invention to combine the headlight control switch and the horn control switch in such a manner that the operation of the same switch may be used to sound the horn only, or to select the headlight beam only, or simultaneously to sound the horn and select the headlight beam.

The manner in which the foregoing objects are attained is set forth in the following specification and the accompanying drawings in which:

Fig. 1 is a diagrammatic view showing the wiring diagram and the beam selecting mechanism.

Fig. 2 is a diagrammatic, fragmentary top plan view of the front part of an automobile showing the location of the various parts.

Fig. 3 is a view of the means for operating the switch controlling the beam selector.

Fig. 4 is an end elevational view of the beam selector, looking in the direction of line 4—4 on Fig. 5.

Fig. 5 is a side elevational view of the beam selector.

Fig. 6 is an end view of the selector looking in the direction of line 6—6 on Fig. 5.

As shown in Fig. 1 line terminal of the battery is connected, by line 10, to a solenoid 12 which is adapted to close switch 14 so as to energize line 16. The solenoid 12 is connected by line 18 to the horn button switch 20 which is carried by the steering wheel. By this arrangement, when switch 20 is closed, solenoid 12 is energized and switch 14 is closed and vice versa. Line 16 leads to a delayed action relay 22 which is cut into the line in advance of, or which could be incorporated in, solenoid 23. Solenoid 23 is adapted to close switch 24 which is connected by line 25 to a conventional horn 26.

Line 16 is also connected by line 28 to a two position switch 30 one terminal of which is connected by line 32 to horn 26 and the other side of which is connected by a line 34 to a beam selector mechanism which is best shown in Figs. 4, 5 and 6 and which will be later on described.

The line terminal of the battery is also connected, through line 36, to one terminal of a switch 38, the other terminal of which is connected, by wire 39 to a conducting segment 40 carried by one face of a disc 42. Passing through disc 42 is a pin 43 which rotatably carries a contact arm 44. Arm 44 is adapted simultaneously to engage the segment 40 and one or another of contacts 46, 48, 50 and 52. Contacts 46 and 48 are connected by wires 62 and 63 to wire 64 which leads to the low beam filaments 66 and contacts 50 and 52 are connected by 68 and 69 to wire 70 which leads to the high beam filaments 72 of the headlights.

The beam selector includes a solenoid 82 the arm of which engages an arm 84 which is adapted to engage and rotate a ratchet 86 to move contact arm 44 relative to disc 42.

The operation is as follows:

If the car is being used in daylight, the lights are not needed and switch 38 is opened as by moving knob 76 of arm 74 to the right as shown in Figs. 2 and 3. Also, switch 30 is actuated, by button 80, so as to connect lines 28 and 32. Under these conditions, when switch 20 is closed the current will flow through line 10, switch 14, line 16, line 28, switch 30 and line 32 and horn 26 will sound immediately.

When the car is used at night, switch 38 is closed by pulling on knob 76 so as to energize line 64 or line 70, depending on the position of arm 44. Switch 30 is now actuated so as to connect line 28 to line 34 and to disconnect line 28 from line 32. In this position when horn switch 20 is closed solenoid 82 is energized and it pulls arm 84 to the left, as viewed in Figs. 1 and 4, to move contact arm from engagement with one of the contacts on disc 42 to another. For example, if a high beam is desired, the momentary closing of switch 20 will move arm 44 from engagement with contact 48 into engagement with contact 52. If arm 44 is in engagement with contact 52 and a low beam is desired, momentary closing of horn switch 20 will energize solenoid 82 and will move arm 44 into engagement with low beam contact 46 and so on. It will be noted that because line 28 is disconnected from line 32, horn 26 can only be energized from line 16 through delayed action relay 22. This means that the horn will not sound unless the horn switch 20 is held closed long enough for solenoid 23 to close switch 24.

By this arrangement, the lights can be changed from high to low beam and back, without sounding the horn. But, if during night driving, it is desired to change the light beam and to sound the horn at the same time, it is merely necessary to hold switch 20 closed a little longer. In this connection, it is pointed out that relay 22 serves as to delay the closing of switch 24 long enough to permit the energization of solenoid 82 before solenoid 23. This is only a fraction of a second.

In city night driving, it may be desirable to use the low beam exclusively and, to that end, the low beam is first selected and switch 30 is moved to the position in which it connects lines 28 and 32 and disconnects lines 28 and 34, so as to disable the beam selecting mechanism. In this position the relay 22 is by-passed and the horn is energized by lines 28 and 32.

From the diagrammatic view of Fig. 2, it will be seen that the battery and switch 38 which connect the battery to the headlights 88 are placed only a few inches from the headlight thus reducing resistance loss to near zero. This makes for brighter lights and saves the cost of running wires from the battery to a switch on the instrument panel and back to the light. This is rendered possible by operating switch 38 by means of cable or rod 74 which leads from switch 38 to the instrument panel. Along the same lines, switch 30 is also to be located near the front end of the car and is to be operated by means of a wire or rod, not shown, and extending from switch 30 to button 80 on the instrument panel. By this arrangement, not only is there considerable saving in current and in the initial cost of wiring but the cost of maintenance and the risk of a fire hazard is reduced also. This is due to the fact that wires extend from the instrument panel to the headlights, as in conventional practice, are exposed to heat and grime and to more or less rough handling during servicing or repair of the car and are therefore a source of frequent and sometimes serious trouble.

Also by the arrangement disclosed a more effective warning is given. For example, if an approaching vehicle does respond to a change of beam, or it appears to be approaching over the center line, the driver can press the horn button not only to flick the lights but to sound the horn also, thus giving visual and audible signals by means of one operation instead of having to sound the horn by means of the switch on the steering wheel and changing the light beam with the foot operated switch.

What I claim is:

1. For use in connection with a vehicle having a horn, headlights of the type which have a high beam filament, and a low beam filament, and a battery for energizing said horn and said lights, actuating means for selectively sounding said horn only, for selectively changing the beam of the headlights only, and for both sounding the horn and changing said beam simultaneously, said means comprising a first circuit, a second circuit, a selective contact mechanism movable to a first position in which it connects said first circuit to the low beam filament of said headlights, and to a second position in which it connects to said second circuit to the high beam filament of said headlights, a ratchet mechanism for moving said selective contact mechanism to its first or to its second position, a first electrically operated device for intermittently actuating said ratchet to move said selective contact mechanism to either of its positions, a third circuit for connecting said selective contact mechanism directly to said battery, a first control switch for opening or closing said third circuit, a fourth circuit adapted to connect the horn to said battery, a time relay interposed in said fourth circuit between said horn and said battery, a second, a normally open control switch in said fourth circuit, a second electrically operated device for closing said switch, a fifth circuit, a selector switch in said fifth circuit movable to a first position in which it connects the horn, through said second normally open control switch, to said battery, and to a second position in which it connects said first electrically operated device, through said second normally open control switch, to said battery, and a third normally open control switch for connecting said second electrically operated device to said battery.

2. The structure related in claim 1, in which all of the circuits and switches mentioned are located near said headlights and only the third normally open control switch and the selector switch are located at the instrument panel of the vehicle thereby to reduce resistance losses intermediate the battery and the headlight filaments.

3. For use in connection with a vehicle having a horn, headlights of the type which have a high beam filament, and a low beam filament, and a battery for energizing said horn and said lights, actuating means for selectively sounding said horn only, for selectively changing the beam of the headlights only, and for both sounding the horn and changing said beam, said means comprising a contact mechanism selectively electrically connectable to said low beam filament or to said high beam filament, means for connecting said mechanism to, and for disconnecting it from, said battery, electrically operated actuating means for actuating said contact mechanism into contact with either of said filaments, a first circuit including a time delay for connecting said horn to said battery, a second circuit for selectively connecting said horn, or said actuating means to said battery, a two-position switch for controlling said second circuit, a normally open switch between said second circuit and said battery, and means for closing said switch.

References Cited in the file of this patent

UNITED STATES PATENTS

| | | |
|---|---|---|
| 1,610,313 | Pillars et al. | Dec. 14, 1926 |
| 1,967,158 | Landis et al. | July 17, 1934 |
| 2,303,315 | Bales | Dec. 1, 1942 |
| 2,579,292 | Brelsford | Dec. 18, 1951 |
| 2,590,606 | Golden | Mar. 25, 1952 |